United States Patent [19]

McDunn

[11] 4,177,697

[45] Dec. 11, 1979

[54] APPARATUS FOR SHARPENING A CHAIN SAW

[76] Inventor: Edward C. McDunn, Barnesville, Minn. 56514

[21] Appl. No.: 856,999

[22] Filed: Dec. 2, 1977

[51] Int. Cl.² .......................................... B23D 63/16
[52] U.S. Cl. ...................................... 76/25 A; 76/36
[58] Field of Search ................... 76/25 A, 36, 31, 33, 76/74

[56] References Cited

U.S. PATENT DOCUMENTS

| 193,182 | 7/1877 | Root | 76/31 |
|---|---|---|---|
| 2,019,330 | 10/1935 | Altman | 76/31 |
| 2,543,504 | 2/1951 | Lewis | 76/34 |
| 2,633,761 | 4/1953 | Butts | 76/25 A |
| 2,643,553 | 6/1953 | Evanoff | 76/25 A |
| 2,885,911 | 5/1959 | Minici | 76/31 |
| 3,744,349 | 7/1973 | Juncker | 76/31 |

FOREIGN PATENT DOCUMENTS

| 587303 | 11/1959 | Canada | 76/36 |
|---|---|---|---|
| 2260990 | 6/1973 | Fed. Rep. of Germany | 76/25 A |

*Primary Examiner*—Harold D. Whitehead
*Assistant Examiner*—Roscoe V. Parker
*Attorney, Agent, or Firm*—Burd, Braddock & Bartz

[57] ABSTRACT

A portable apparatus useable with a rod file to sharpen the teeth of a chain saw. The apparatus has a base that clamps onto the blade of the saw. A chain holding finger mounted on a support carried by the base fixes the position of the tooth to be sharpened and aligns the rod file with the cutting edge of this tooth. An angled groove in the base serves as a guide and support for a slide attached to the file so that the file sharpens the tooth at a fixed angle and elevation.

28 Claims, 7 Drawing Figures

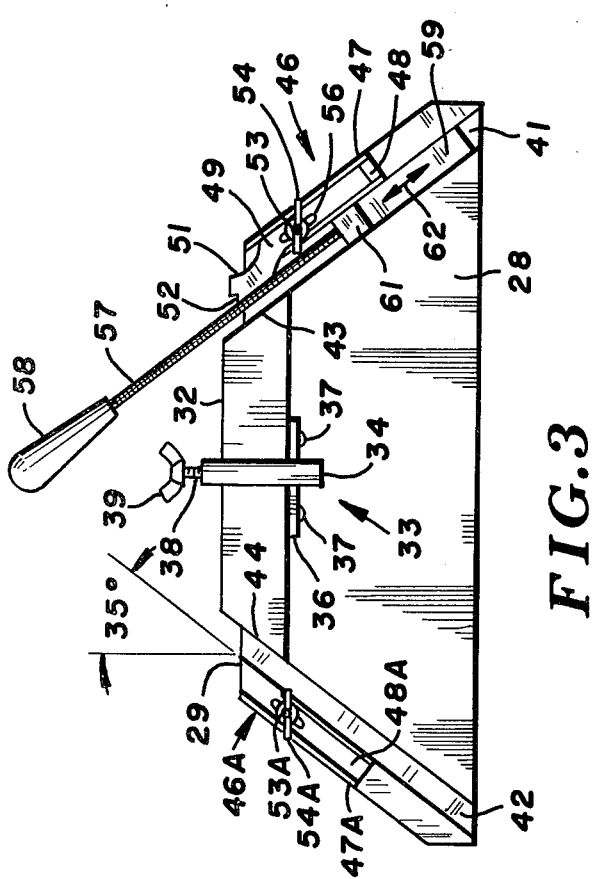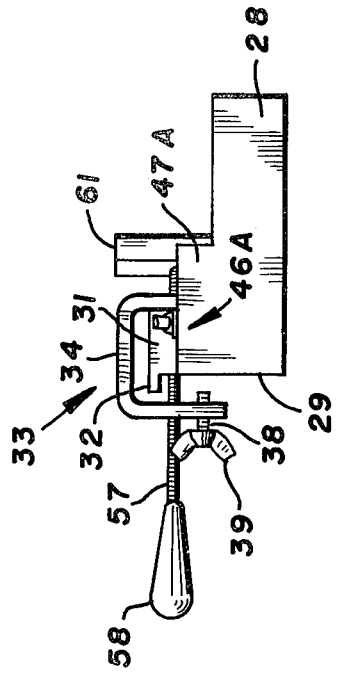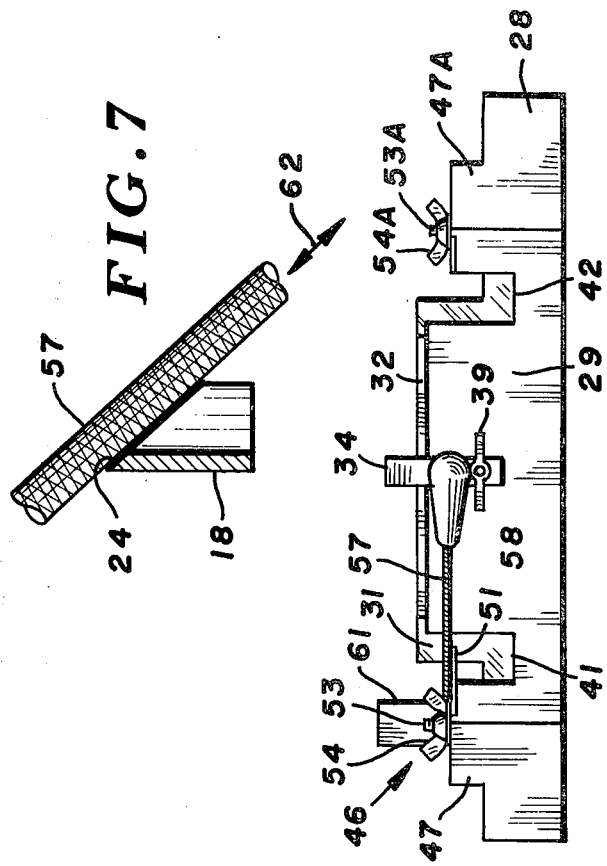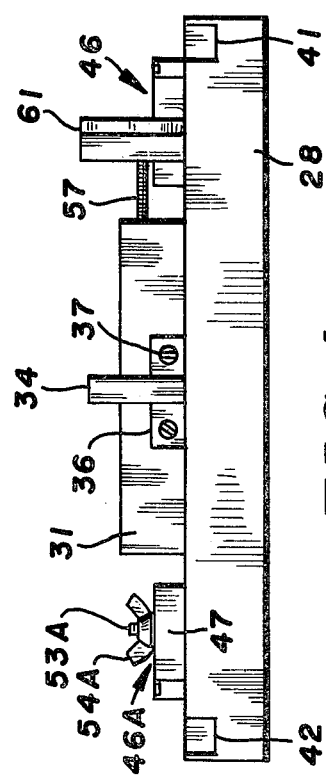

APPARATUS FOR SHARPENING A CHAIN SAW

BACKGROUND OF INVENTION

Chain saws have endless power driven chains carrying cutting teeth. In use, the cutting teeth become dull, thereby reducing the cutting effectiveness of the saw. The teeth must be periodically sharpened. In practice, the chain with the dull teeth is removed from the blade and replaced with a chain having sharp teeth. This is a time consuming task and requires two chains. Some chain saws are equipped with self-sharpening devices that are operable to sharpen the cutting teeth during operation of the chain.

SUMMARY OF INVENTION

The invention is directed to an apparatus useable to sharpen the cutting teeth of a chain saw on the job and in the field. The apparatus is portable so that it can be transported with the chain saw, making it available for use when needed. The apparatus has base means clamped to the blade of the chain saw. A chain holder mounted on the base means aligns the base means with a tooth to be sharpened and fixes the position of the tooth. An angled groove in the base means serves as a guideway for a slide attached to a rod file. The groove maintains a selected cutting angle and elevation for the rod file so that all teeth are sharpened substantially the same.

An object of the invention is to provide a portable, low cost apparatus useable with a rod file to sharpen the teeth of a chain saw. Another object of the invention is to provide a chain saw sharpening apparatus that guides a rod file along a selected path so that all teeth of a chain saw have substantially the same cutting angle. Yet another object of the invention is to provide a chain saw sharpening apparatus with teeth holding structure that fixes a tooth on the blade so that it can be accurately sharpened. These and other advantages of the chain saw sharpening apparatus of the invention are embodied in the following detailed description of one embodiment thereof.

IN THE DRAWINGS

FIG. 3 is a top plan view of the apparatus for sharpening the cutting edges of the teeth of the chain;

FIG. 4 is a front elevational view of FIG. 3;

FIG. 5 is a rear elevational view of FIG. 3;

FIG. 6 is an end elevational view of FIG. 3; and

FIG. 7 is an enlarged sectional view taken along the line 7—7 of FIG. 2.

DETAILED DESCRIPTION OF PREFERRED EMBODIMENT

Figures 1, 2:
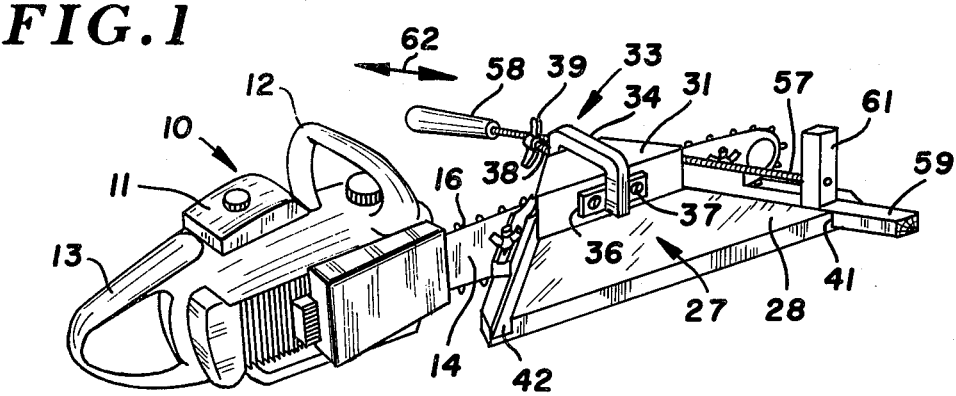
FIG. 1 is a perspective view of a chain saw associated with the apparatus of the invention for sharpening the chain.
FIG. 2 is an enlarged perspective view of a portion of the chain saw blade and apparatus for sharpening the cutting edges of the teeth of the chain.

Referring to FIG. 1, there is shown a conventional chain saw indicated generally at 10. Chain saw 10 has a housing surrounding a motor as in a small internal combustion engine. Housing 11 has a pair of handles 12 and 13 which facilitate the carrying and use of the saw. Saw 10 has an elongated flat blade 14. An endless link chain 16 is trained about blade 14. The chain 16 is drivably connected to the motor so that on operation of the motor chain 16 moves around blade 14. Chain 16 has a plurality of spaced left and right cutting teeth 17 and 18. Connecting links 19 are joined to teeth 17 and 18 with pivot pins 21. Blade 14 has a peripheral groove 22, as shown in FIG. 2, to accommodate a lower portion of a link 23. Groove 22 serves as a guideway to maintain chain 16 on the peripheral upper and lower edges of blade 14.

As shown in FIG. 2, the right blade 18 has an arcuately curved body having a curved forward cutting edge 24. Located in front of cutting edge 24 is a depth post 26. Post 26 is spaced inwardly of the cutting edge 24 so as to function as a stop, which determines the depth of the cut of tooth 18. The left tooth 17 has the same structure as the tooth 18 with the body turned to the left. The right and left teeth are alternately located along the endless length of chain 16.

An apparatus indicated generally at 27 for sharpening the cutting edge 24 of each tooth is mounted on the blade 14 in FIG. 1. Apparatus 27 has a generally flat base 28 having an upright face or surface 29 that engages the flat side of blade 14. An upright member or block 31 is joined to one side of base 27. Member 31 has a face that is coextensive with the face 29. A portion of face 29 on the member 31 engages a segment of chain 16 to hold the chain 16 in a fixed position on blade 14. Member 31 has a forwardly and laterally directed lip 32 that extends over chain 16. Lip 32 holds chain 16 in engagement with the top edge of blade 14.

A C-clamp indicated generally at 33 mounted on member 31 is operable to engage blade 14 to clamp the apparatus 27 on blade 14. Clamp 33 has an inverted U-shaped member 34. A transverse flat plate 36 is secured to one end of member 34 and attached with screws 37 to block upright member 31. The opposite end of U-shaped member 34 extends downwardly adjacent face 29. A bolt 38 is threaded in the lower portion of member 34. Bolt 38 has a wing head 39 which facilitates the rotation of the bolt. In use, the wing head is rotated, thereby turning bolt 38 in a threaded hole in member 34. The forward end of the bolt 38 engages the side of blade 14, thereby clamping blade 14 between bolt 38 and face 29.

Referring to FIG. 3, the opposite ends of base 28 have converging grooves or ways 41 and 42. Grooves 41 and 42 have a generally U-shaped cross section and extend at an angle across base 28. Grooves 41 and 42 converge toward each other in a rearward direction. Preferably, each groove 41 and 42 is located along a line that is 35 degrees from the transverse of horizontal line, as shown in FIG. 3. The 35 degree angle corresponds to the angle of the cutting edge 24 of each tooth. Member 31 has opposite ends with tapered faces 43 and 44 that are coextensive with the inner edges of the grooves 41 and 42, respectively.

A lock unit indicated generally at 46 operates to hold the tooth that is being sharpened in a fixed or stationary position. The lock unit 46 has an upright support or block 47 attached to the end of base 28 adjacent the outside of groove 41. The top of support 47 has a longitudinal groove or recess 48. A flat holding finger 49 is disposed in groove 48. Groove 48 locates the holding finger 49 in a fixed position preventing it from rotating as the sides of finger 49 engages the sides of block 47 that forms groove 48.

Holding finger 49 has a curved forward end 51. The terminal part of end 51 has a notch or cut out section 52.

As shown in FIG. 2, tooth 18 fits into notch 52 so that holding finger 49 firmly supports tooth 18. Holding finger 49 is retained in groove 48 with a bolt 53 and a wing nut 54. Bolt 53 is anchored in block 47. The finger 49 has an elongated slot 56 which permits longitudinal adjustment of finger 49 on block 47. Other means, such as a bolt threaded into block 47, can be used to hold finger 49 in groove 48.

A second lock unit 46A is located adjacent the outside of groove 42. Lock 46A is identical to lock 46. Like parts have the same reference numeral, with the suffix A. Holding finger 49 is used with block 47A. The finger 49 is removed from block 47 and turned 180 degrees and placed in groove 48A. Wing nut 54A is used in conjunction with bolt 53A to secure holding finger 49 on block 47A. The lock unit 46A is used to hold the right hand teeth 18, as shown in FIG. 2. The lock unit 46 holds the left hand teeth 17, as shown in FIG. 3.

Referring to FIG. 3, the teeth are sharpened with a rod file 57 having a circular cross section. A handle 58 is attached to one end of file 57. An L-shaped slide 59 is secured to the opposite end of file 57. The slide 59 has an upright post 61 having a hole or attaching structure for the end of file 57. Post 61 can have additional holes to accommodate different size files. The file 57 is located generally parallel to the bottom of groove 41 and in alignment with the cutting edge 24 of tooth 18. The slide 59 has a generally rectangular shape and fits with a sliding fit in groove 41 so that groove 41 serves as a guideway and support for the slide. The groove 41 thereby horizontally positions the file 57 and angularly orients the file 57 relative to the cutting edge 24 of tooth 18. File 57 is located at the same angle, preferably 35 degrees, as the angle of groove 41 and cutting angle of the cutting edge 24. FIG. 7 shows the angular position of file 57 relative to cutting edge 24 of tooth 18. This angle does not change during the filing or sharpening of the tooth.

In use, base 28 is located adjacent a side of the saw blade 14. Holding finger 49 is mounted on the block 47 and retained thereby by nut 54. The tooth to be sharpened is placed in the notch 52. This aligns groove 41 with the tooth so that the file 57 is in horizontal and angular alignment with the cutting face of tooth 18. C-clamp 33 is turned down to lock base 28 and face 29 in firm engagement with the sides of the blade 14 and the side of chain 16. The tightening of C-clamp 33 also holds finger 49 in firm engagement with the tooth to be sharpened. Chain 16 is held rigid so that it can't shatter during the sharpening.

The teeth are sharpened by placing the slide 59 in groove 41 and reciprocating the file 57 in the direction of the arrow 62. As shown in FIG. 7, the file 57 is at an angle, preferably 35 degrees, with respect to tooth 18. This angle remains fixed and follows the angle of groove 41. The slide also functions to hold the file 57 in a horizontal position thereby making it impossible to sharpen the saw tooth wrong. The teeth are sequentially sharpened by repositioning the apparatus on blade 14.

The right hand teeth 18, as shown in FIG. 2, are sharpened by placing the base 28 on the opposite side of the blade 14 and changing the holding finger 49 to the opposite support 47A. Nut 54A is used to retain the holding finger 49 in the block groove 48A. The right hand teeth are sharpened sequentially by repositioning the apparatus on blade 14 and moving the chain to properly position the tooth to be sharpened.

Apparatus 27 is portable, and thereby can be used on the job in the field. It is readily attached to the blade of a conventional chain saw without special tools. The C-clamp and base structure is adapted to be mounted on all makes of chain saws so that it has universal use. The guide or slide being slidably located in the guide groove 41 provides a fixed cutting angle for file 57. The grooves 41 and 42 also provide horizontal support for the file so that the file can only move back and forth along its longitudinal axis during the sharpening of the tooth. All of the teeth are sharpened at the same angle thereby the saw, when used, will cut a straight cut through the wood.

The above description is directed to one embodiment of the apparatus for sharpening the cutting teeth of a chain saw. Changes in structures and materials can be made without departing from the invention. The base 28, member 31, and supports 47 and 47A can be made of wood, one-piece metal, plastic or other suitable material. The C-clamp can be formed integral with member 31. Other types of holding structures can be used to mount the base on the saw blade. The invention is defined in the following claims.

The embodiments of the invention in which an exclusive property or privilege is claimed are defined as follows:

1. An apparatus for sharpening the cutting teeth of a chain saw having a blade and a chain movably mounted on the blade, said chain having teeth operable to cut material, as wood, each tooth having a forward cutting edge, comprising: a base, means mounted on the base operable to hold the base on the blade, a rod file having a forward end and a handle end, an elongated non-rotatable slide, means connecting the forward end of the file to the slide, said handle end of the file being free to be moved in a direction whereby the file can be moved into engagement with the forward cutting edge of a tooth, said base having linear surfaces forming at least one linear groove providing guide means for accommodating the slide for movement along the linear path of said groove, said slide having linear external surfaces located in sliding engagement with surfaces of the base forming the groove therein whereby the slide and file can be moved in opposite directions along said linear path, said guide means locating the slide at an angle relative to the side of the blade to position the rod file at an angle relative to the forward cutting edge of a tooth of the chain, and holding means mounted on the base engageable with said tooth of the chain to hold the tooth in a fixed position and to align the file with the forward cutting edge of said tooth, said holding means extended in the general longitudinal direction of the file means and having a portion engageable with the side of the tooth that is to be sharpened whereby the rod file can be moved along said linear path to sharpen the forward cutting edge of said tooth.

2. The apparatus of claim 1 wherein: the base has a generally flat portion.

3. The apparatus of claim 2 wherein: said flat portion has opposite ends, and said guide means comprise a pair of grooves in said flat portion, said grooves being located adjacent the opposite ends of the flat portion and converging toward said blade.

4. The apparatus of claim 1 wherein: said means mounted on the base includes clamp means for releasably mounting the base on the blade.

5. The apparatus of claim 1 wherein: the holding means includes a holding finger having an end engageable with said tooth.

6. The apparatus of claim 5 wherein: the end of the finger has a notch for accommodating the tooth.

7. The apparatus of claim 1 wherein: said base has a support for mounting the holding means, and means attaching the holding means to the support.

8. The apparatus of claim 7 wherein: said means attaching the holding means to the support comprises releasable means whereby the holding means can be removed from the support.

9. The apparatus of claim 8 wherein: the holding means has an elongated slot accommodating the releasable means whereby the position of the holding means on the support can be adjusted.

10. The apparatus of claim 7 wherein: the support has a top portion, said top portion having a groove, and said holding means including a finger located in said groove.

11. The apparatus of claim 1 wherein: said base has opposite ends and supports adjacent the opposite ends for mounting said holding means, and means associated with each support for attaching the holding means to the support.

12. The apparatus of claim 11 wherein: said guide means comprise grooves in the base for accommodating the slide, said grooves located adjacent the supports.

13. The apparatus of claim 1 wherein: the means connecting the forward end of the file to the slide comprises an upright post mounted on the slide.

14. The apparatus of claim 1 wherein: the holding means includes a finger having first and second portions forming a notch for accommodating the tooth, said first portion engageable with said tooth to hold the tooth in a fixed position, and said second portion engageable with said tooth to align the forward cutting edge of the tooth with the file.

15. The apparatus of claim 14 wherein: said base includes means having a groove, said finger being located in said groove, and means connecting the finger to the means having a groove.

16. An apparatus for sharpening the cutting teeth of a chain saw having a blade and a chain movably mounted on the blade, said chain having teeth operable to cut material, as wood, each chain tooth having a forward cutting edge, comprising: a base, means operable to hold the base on the blade, file means movable to sharpen the cutting edge of a tooth of a chain saw, said file means comprising an elongated file having a forward end and a handle end, movable means connected to the forward end of the file, said handle end of the file being free to be moved in a direction whereby the file can be moved into engagement with the forward cutting edge of a tooth, said base having surfaces forming linear groove means extended at an angle relative to the side of the blade to position the file means at an angle relative to the forward cutting edge of the tooth, said movable means having linear external surfaces located in sliding engagement with the surfaces of the base forming the groove means therein for guiding the movable means for movement in the linear path of the groove means, said handle end of the file being free to be moved in a direction whereby the file can be moved into engagement with the forward cutting edge of a tooth, and holding means mounted on the base engageable with the chain tooth to be sharpened with the file means to hold said tooth in a fixed position, said holding means extended in the general longitudinal direction of the file means and having a portion engageable with the side of the tooth that is to be sharpened whereby the file means can be moved to sharpen the cutting edge of said tooth.

17. The apparatus of claim 16 wherein: said means for guiding the movable means includes a pair of grooves in said base and said movable means including slide means connected to the file means adapted to fit into one of the grooves for movement in a linear direction, said grooves converging toward said blade.

18. The apparatus of claim 16 wherein: said means operable to hold the base on the blade includes a clamp means for releasably mounting the base on the blade.

19. The apparatus of claim 16 wherein: the holding means includes a holding finger having an end engageable with said tooth.

20. The apparatus of claim 19 wherein: the end of the finger has a notch for accommodating the tooth.

21. The apparatus of claim 16 wherein: said base includes a support for mounting the holding means, and means for attaching the holding means to the support.

22. The apparatus of claim 21 wherein: said means attaching the holding means to the support comprises a releasable means whereby the holding means can be removed from the support.

23. The apparatus of claim 21 wherein: the holding means has an elongated slot accommodating the releasable means whereby the position of the holding means on the support can be adjusted.

24. The apparatus of claim 21 wherein: the support has a top portion, said top portion having a groove, and said holding means including a finger located in said groove.

25. The apparatus of claim 16 wherein: said base has opposite ends and supports adjacent the opposite ends for mounting said holding means, and means associated with each support for attaching the holding means to the support.

26. The apparatus of claim 16 wherein: the movable means connected to the forward end of the file includes a slide cooperating with the means for guiding the movable means and an upright post mounted on the slide, said forward end of the file being connected to the post.

27. The apparatus of claim 16 wherein: the holding means includes a finger having first and second portions forming a notch for accommodating the tooth, said first portion engageable with said tooth to hold the tooth in a fixed position, and said second portion engageable with said tooth to align the forward cutting edge of the tooth with the file.

28. The apparatus of claim 27 wherein: said base includes means having a groove, said finger being located in said groove, and means connecting the finger to the means having a groove.

* * * * *